United States Patent
Kim et al.

(10) Patent No.: US 11,127,372 B2
(45) Date of Patent: Sep. 21, 2021

(54) DISPLAY DEVICE AND METHOD

(71) Applicant: LG ELECTRONICS INC., Seoul (KR)

(72) Inventors: Dong Ho Kim, Seoul (KR); Yun Jun Choi, Seoul (KR); Seung Jong Choi, Seoul (KR); Sung Jin Kim, Suwon (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/579,764

(22) Filed: Sep. 23, 2019

(65) Prior Publication Data
US 2020/0020303 A1 Jan. 16, 2020

(30) Foreign Application Priority Data
Jul. 30, 2019 (KR) .................. 10-2019-0092714

(51) Int. Cl.
*G09G 5/10* (2006.01)
*G06K 9/32* (2006.01)
*G06N 3/04* (2006.01)
*G06N 3/08* (2006.01)

(52) U.S. Cl.
CPC ............ *G09G 5/10* (2013.01); *G06K 9/3266* (2013.01); *G06N 3/0454* (2013.01); *G06N 3/08* (2013.01); *G09G 2320/029* (2013.01); *G09G 2320/0257* (2013.01); *G09G 2320/046* (2013.01); *G09G 2320/0686* (2013.01)

(58) Field of Classification Search
CPC ..... G09G 2320/0257; G09G 2320/046; G09G 5/10; G09G 2320/0223; G09G 2320/0242; G09G 2320/029; G06K 9/3266; G06N 3/08
See application file for complete search history.

(56) References Cited

U.S. PATENT DOCUMENTS

| | | | | |
|---|---|---|---|---|
| 2011/0115773 | A1* | 5/2011 | Ono | G09G 3/3233 345/211 |
| 2012/0236040 | A1* | 9/2012 | Eom | G09G 3/007 345/681 |
| 2013/0176324 | A1* | 7/2013 | Yamashita | G09G 3/32 345/589 |
| 2017/0076668 | A1* | 3/2017 | Matsui | G09G 3/3233 |

FOREIGN PATENT DOCUMENTS

| | | |
|---|---|---|
| KR | 1020120106558 | 9/2012 |
| KR | 1020180013189 | 2/2018 |

* cited by examiner

*Primary Examiner* — Kent W Chang
*Assistant Examiner* — Scott D Au
(74) *Attorney, Agent, or Firm* — Lee, Hong, Degerman, Kang & Waimey

(57) ABSTRACT

The present disclosure relates to a display device and a display method for reducing a burn-in phenomenon by performing an on-board artificial intelligence (AI) algorithm and/or machine learning algorithm to predict a display duration of an object in an image, and processing the image based on the predicted display duration. The display method according to one embodiment of the present disclosure may include extracting a predetermined type of object from an inputted image, predicting a display duration of the extracted object, and adjusting a luminance value of a pixel in an area corresponding to the object in the image based on the predicted display duration, and displaying the image in which the adjusted luminance value of the pixel is reflected.

18 Claims, 7 Drawing Sheets

DISPLAY DEVICE AND METHOD

CROSS-REFERENCE TO RELATED APPLICATION

Pursuant to 35 U.S.C. § 119(a), this application claims the benefit of earlier filing date and right of priority to Korean Patent Application No. 10-2019-0092714, filed on Jul. 30, 2019, the contents of which are hereby incorporated by reference herein in its entirety.

BACKGROUND

Technical Field

The present disclosure relates to a display device and a display method for reducing a burn-in phenomenon by predicting a display duration of an object in an image and processing the image based on the predicted display duration.

Description of the Related Art

An OLED (organic light emitting diode) display is composed of red, green, and blue color pixels, and R, G, and B color pixels may be combined to form one pixel. Also, each color pixel or color pixels are lit for different times, because each pixel is lit only in the area where an image is displayed. Because OLEDs are organic light-emitting devices, their lifetime decreases during lighting, resulting in lower luminance. That is, each pixel exhibits different luminance for each pixel or for each color pixel (sub-pixel) over time, even though initially maintaining the same luminance. When pixels having different luminance are clustered, they will display colors different from that of the background, which may be revealed as an afterimage.

As one method for preventing occurrence of the afterimage, related art 1 discloses a configuration of detecting accumulated image data for each sub-pixel of a display panel; when the afterimage has occurred, generating a compensation image for compensating the afterimage occurring on the display panel, based on the accumulated image data for each sub-pixel; and displaying the generated compensation image on the display panel. However, in the above-mentioned method, the image is processed to remove the afterimage only after the afterimage has occurred. Thus, it is not possible to prevent the occurrence of afterimage in advance.

Also, in the OLED display, when a fixed image is continuously displayed for a long time, luminous efficiency of the pixel that emits light to display the image is degraded over time, and the light is emitted at a relatively lower brightness than surrounding pixels, thereby easily causing the afterimage phenomenon.

As one method for solving the afterimage with respect to the image, related art 2 discloses a method of providing a GUI (graphical user interface) comprising: shifting an image (for example, an item) displayed immediately before being turned off, by a predetermined interval, every time a display is turned on; and displaying the shifted image. However, in the above-mentioned method, there is a condition that the display needs to be turned on and off periodically. Thus, it is difficult to apply the method to a display that continuously displays a streaming image.

RELATED ART DOCUMENTS

Related Art 1: Korean Patent Application Publication No. 10-2018-0013189 (Feb. 7, 2018) Related Art 2: Korean Patent Application Publication No. 10-2012-0106558 (Sep. 26, 2012)

SUMMARY OF THE INVENTION

The present disclosure is directed to providing a display device and a display method, which include predicting a display duration of an object in an image and adjusting a luminance value of a pixel corresponding to the object in the image based on the predicted display duration, thereby preventing occurrence of a burn-in phenomenon (for example, an afterimage) in advance even when a streaming image is continuously displayed.

The present disclosure is further directed to reducing a burn-in phenomenon for an object that is fixedly displayed for a long time, by extracting at least one of a logo, a word, or a text bar as the object in the image, and adjusting the luminance value of the pixel corresponding to the object in the image based on the display duration of the extracted object.

The present disclosure is further directed to allowing image processing to be performed quickly, by performing a first deep neural network (a learning model which has been trained in advance to recognize the object) algorithm on the image to extract the object from the image, and performing a second deep neural network (a learning model which has been trained in advance to predict a duration of the object) algorithm on the extracted object to predict a display duration of the object.

A display method for reducing a burn-in phenomenon according to one embodiment of the present disclosure may include: extracting a predetermined type of object from an inputted image; predicting a display duration of the extracted object; and adjusting a luminance value of a pixel in an area corresponding to the object in the image based on the predicted display duration, and displaying the image in which the adjusted luminance value of the pixel is reflected.

According to this embodiment of the present disclosure, the extracting the object may include performing a first deep neural network (DNN) algorithm on the image to extract the predetermined type of object from the image, and the predicting the display duration may include performing a second deep neural network algorithm on the extracted object to predict the display duration of the object, wherein the first deep neural network is a learning model which has been trained in advance to recognize a logo, a word, and a text bar in the image, and the second deep neural network is a learning model which has been trained in advance to predict durations of the logo, the word, and the text bar appearing in the image.

According to this embodiment of the present disclosure, the predicting the display duration may include predicting the display duration based on at least one of a position or a size of the object in the image.

According to this embodiment of the present disclosure, the extracting the object may include extracting at least one of the logo, the word, or the text bar as the predetermined type of object.

According to this embodiment of the present disclosure, the displaying the image may include detecting the luminance value of the pixel in the area corresponding to the object; determining a luminance adjustment value based on the predicted display duration; and adjusting the detected luminance value of the pixel based on the luminance adjustment value, and controlling the pixel according to the adjusted luminance value of the pixel.

According to this embodiment of the present disclosure, the displaying the image may further include detecting a color of the pixel in the area corresponding to the object, and the controlling the pixel may include further adjusting the adjusted luminance value of the pixel based on the detected color of the pixel.

According to this embodiment of the present disclosure, the controlling the pixel may include, in response that the adjusted luminance value of the pixel is smaller than a predetermined minimum luminance value, controlling the pixel to the minimum luminance value.

According to this embodiment of the present disclosure, the predicting the display duration may include, in response that the type of object is a word, detecting an attribute of the word and predicting the display duration based on the attribute of the word.

According to this embodiment of the present disclosure, the displaying the image may include, in response that the type of object is a logo, dividing the logo into a plurality of segments based on a luminance value of a pixel in the logo, and detecting a luminance value corresponding to each of the divided plurality of segments; determining a degree of burn-in effect for each luminance value for each of the plurality of segments in the logo; determining a luminance adjustment value for each of the plurality of segments based on the determined degree of burn-in effect for each luminance value and the predicted display duration; and adjusting the luminance value corresponding to each of the divided plurality of segments, based on the determined luminance adjustment value for each of the plurality of segments, and controlling pixels in the plurality of segments according to the adjusted luminance value.

According to this embodiment of the present disclosure, the displaying the image may include, in response that the type of object is a logo, dividing the logo into a plurality of segments based on a color of the pixel in the logo and detecting the luminance value corresponding to each of the divided plurality of segments; determining a degree of burn-in effect for each color for each of the plurality of segments in the logo; determining a luminance adjustment value for each of the plurality of segments based on the determined degree of burn-in effect for each color and the predicted display duration; and adjusting the luminance value corresponding to each of the divided plurality of segments, based on the determined luminance adjustment value for each of the plurality of segments, and controlling pixels in the plurality of segments according to the adjusted luminance value.

A display device configured to reduce a burn-in phenomenon according to another embodiment of the present disclosure may include: a predictor configured to extract a predetermined type of object from an inputted image, and predict a display duration of the extracted object; and a processor configured to adjust a luminance value of a pixel in an area corresponding to the object in the image based on the predicted display duration, and display the image in which the adjusted luminance value of the pixel is reflected.

According to this embodiment of the present disclosure, the predictor may be configured to perform a first deep neural network (DNN) algorithm on the image to extract the predetermined type of object from the image, and perform a second deep neural network algorithm on the extracted object to predict the display duration of the object, wherein the first deep neural network is a learning model which has been trained in advance to recognize a logo, a word, and a text bar in the image, and the second deep neural network is a learning model which has been trained in advance to predict durations of the logo, the word, and the text bar appearing in the image.

According to this embodiment of the present disclosure, the predictor may be configured to predict the display duration based on at least one of a position or a size of the object in the image.

According to this embodiment of the present disclosure, the predictor may be configured to extract at least one of the logo, the word, or the text bar as the predetermined type of object.

According to this embodiment of the present disclosure, the processor may include a detector configured to detect the luminance value of the pixel in the area corresponding to the object; a determiner configured to determine a luminance adjustment value based on the predicted display duration; and a controller configured to adjust the detected luminance value of the pixel based on the luminance adjustment value, and control the pixel according to the adjusted luminance value of the pixel.

According to this embodiment of the present disclosure, the controller may be configured to, in response that the detector further detects a color of the pixel in the area corresponding to the object, further adjust the adjusted luminance value of the pixel based on the detected color of the pixel.

According to this embodiment of the present disclosure, the controller may be configured to, in response that the adjusted luminance value of the pixel is smaller than a predetermined minimum luminance value, control the pixel to the minimum luminance value.

According to this embodiment of the present disclosure, the predictor may be configured to, in response that the type of object is a word, detect an attribute of the word and predict the display duration based on the attribute of the word.

According to this embodiment of the present disclosure, the processor may include a detector configured to, when the type of object is the logo, divide the logo into a plurality of segments based on a luminance value of a pixel in the logo, and detect a luminance value corresponding to each of the divided plurality of segments; a determiner configured to determine a degree of burn-in effect for each luminance value for each of the plurality of segments in the logo and determine a luminance adjustment value for each of the plurality of segments based on the determined degree of burn-in effect for each luminance value and the predicted display duration; and a controller configured to adjust the luminance value corresponding to each of the divided plurality of segments, based on the determined luminance adjustment value for each of the plurality of segments, and control pixels in the plurality of segments according to the adjusted luminance value.

According to this embodiment of the present disclosure, the processor may include a detector configured to, in response that the type of object is a logo, divide the logo into a plurality of segments based on a color of the pixel in the logo and detect the luminance value corresponding to each of the divided plurality of segments; a determiner configured to determine a degree of burn-in effect for each color for each of the plurality of segments in the logo and determine a luminance adjustment value for each of the plurality of segments based on the determined degree of burn-in effect for each color and the predicted display duration; and a controller configured to adjust the luminance value corresponding to each of the divided plurality of segments, based on the determined luminance adjustment value for each of the plurality of segments, and control pixels in the plurality of segments according to the adjusted luminance value.

In addition, other methods and other systems for implementing the present disclosure, and a computer-readable recording medium storing computer programs for executing the above methods may be further provided.

The above and other aspects, features, and advantages of the present disclosure will become apparent from the detailed description of the following aspects in conjunction with accompanying drawings.

According to embodiments of the present disclosure, the display duration for an object in an image may be predicted, and the luminance value of a pixel corresponding to the object in the image may be adjusted based on the predicted display duration, thereby preventing occurrence of a burn-in phenomenon (for example, an afterimage) in advance even if a streaming image is continuously displayed.

According to the embodiments of the present disclosure, at least one of a logo, a word, or a text bar may be extracted as the object in the image, and the luminance value of the pixel corresponding to the object in the image may be adjusted based on the display duration of the extracted image, thereby reducing the burn-in phenomenon for the object that is fixedly displayed for a long time.

Also, according to the embodiments of the present disclosure, a first deep neural network (a learning model which has been trained in advance to recognize the object) algorithm may be performed on the image to extract the object from the image, and a second deep neural network (a learning model which has been trained in advance to predict duration of the object) algorithm may be performed on the extracted object to predict display duration of the object, thereby allowing image processing to be performed quickly.

The effects of the present disclosure are not limited to the above-mentioned effects, and other effects not mentioned may be clearly understood by those skilled in the art from the following description.

DETAILED DESCRIPTION OF THE INVENTION

Figure 1:
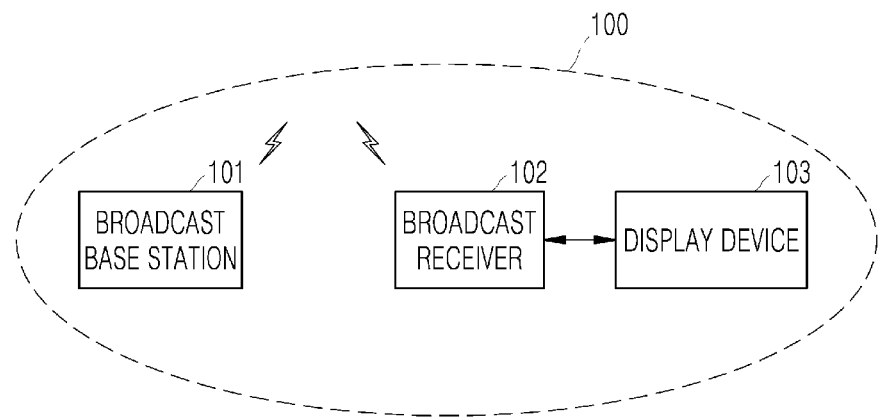
FIG. 1 is a diagram illustrating a configuration of a network including a display device according to one embodiment of the present disclosure.

Advantages and features of the present disclosure and methods of achieving the advantages and features will be more apparent with reference to the following detailed description of example embodiments in connection with the accompanying drawings. However, the present disclosure is not limited to the embodiments disclosed below but may be implemented in various different forms, and should be construed as including all modifications, equivalents, or alternatives that fall within the spirit and scope of the present disclosure. The example embodiments disclosed below are provided so that the present disclosure will be thorough and complete, and also to provide a more complete understanding of the scope of the present disclosure to those of ordinary skill in the art. In relation to describing the present disclosure, when the detailed description of the relevant known technology is determined to unnecessarily obscure the gist of the present disclosure, the detailed description may be omitted.

The terminology used herein is used for the purpose of describing particular embodiments merely and is not intended to limit the scope of the present disclosure. As used herein, the articles "a," "an," and "the," include plural referents unless the context clearly dictates otherwise. As used herein, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof. The terms such as "the first," "the second," and the like may be used in describing various components, but the above components shall not be restricted to the above terms. The terms are only used to distinguish one component from the other.

In the following, the embodiments according to the present disclosure will be described in greater detail with reference to the accompanying drawings, and in the description with reference to the accompanying drawings, the identical or analogous components are designated by the same reference numeral, and repeated description thereof will be omitted.

FIG. 1 is a diagram illustrating a configuration of a network including a display device according to one embodiment of the present disclosure.

Referring to FIG. 1, the network 100 may include a broadcast base station 101, a broadcast receiver 102, and a display device 103.

The broadcast base station 101 may transmit broadcast data to the broadcast receiver 102.

The broadcast receiver 102 may receive the broadcast data from the broadcast base station 101, extract, from the received broadcast data, an image corresponding to a channel inputted by a user (for example, a channel number inputted through a remote control), and provide the extracted image to the display device 103.

The display device 103 may be connected to the broadcast receiver 102 by wire or wirelessly, but is not limited thereto, and may be included in the broadcast receiver 102. The display device 103 may display the image that is provided from the broadcast receiver 102. In this case, the display device 103 may predict a display duration of an object in the image and adjust a luminance value of a pixel corresponding to the object in the image based on the predicted display duration, thereby reducing a burn-in phenomenon.

Figure 2:
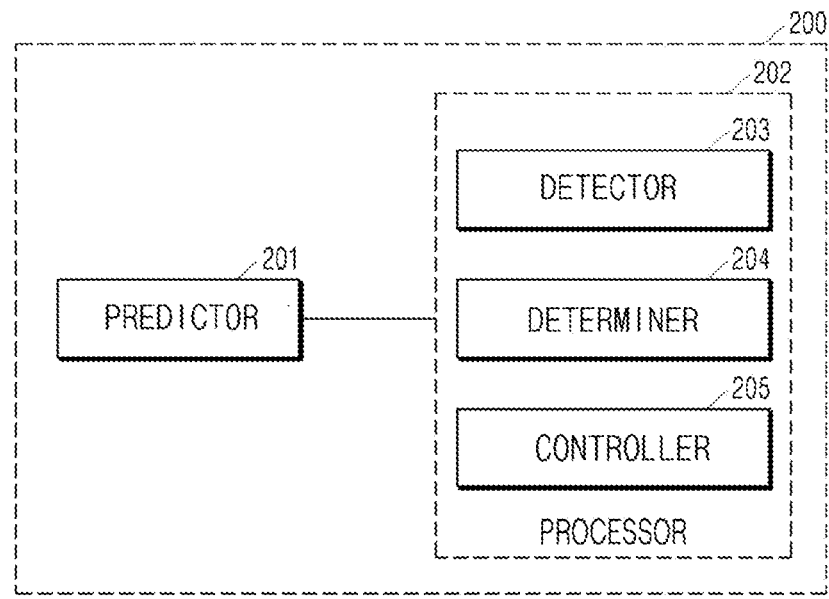
FIG. 2 is a diagram illustrating a configuration of the display device according to one embodiment of the present disclosure.

FIG. 2 is a diagram illustrating a configuration of the display device according to one embodiment of the present disclosure.

Referring to FIG. 2, a display device 200 according to one embodiment of the present disclosure may include a predictor 201 and a processor 202.

The predictor 201 may extract a predetermined type of object from an inputted image, and predict a display duration of the extracted object. Here, the predictor 201 may extract at least one of a logo, a word, or a text bar as the predetermined type of object. In this case, when the word is included in the text bar, the predictor 201 may extract the text bar from the image and then extract the word from the extracted text bar.

More specifically, the predictor 201 may perform a first deep neural network algorithm on the image to extract the predetermined type of object from the image. Here, the first deep neural network is a learning model which has been trained in advance to recognize the logo (for example, an image representing a company), the word (for example, a letter), and the text bar (for example, a rectangle containing letters) in the image.

Also, the predictor 201 may perform a second deep neural network algorithm on the extracted object to predict a display duration of the object. Here, the second deep neural network is a learning model which has been trained in advance to predict durations of the logo, the word, and the text bar appearing in the image. That is, the predictor 201 may predict a time for which the extracted object is expected to be continuously displayed in the plurality of images without being changed, even though the image is inputted periodically.

For example, in an environment in which 60 images are inputted and displayed for 1 second, when the predicted display duration of an 'NBC' logo in the image is '10 minutes,' this may mean that the 'NBC' logo is displayed continuously for '10 minutes' as each of the 36000 (60*10*60) inputted images contains the 'NBC' logo in the same position.

In predicting the display duration of the object, the predictor 201 may predict the display duration based on at least one of a position (for example, a pixel position spaced apart from a top, bottom, or reference pixel by n pixels (where n is a natural number)) or a size (or a form) of the object in the image.

Also, in response that the type of object is a word, the predictor 201 may detect an attribute (for example, stocks, exchange rates, weather, or the like) of the word, and predict the display duration based on the attribute of the word. By doing so, the predictor 201 may accurately obtain the display duration of the word (for example, short display duration) that changes relatively frequently compared to words of other attributes. Here, the attribute of the word may be a type of information indicated by the word. For example, when the attribute of the word is detected as 'stock', the predictor 201 may predict a predetermined prediction time in relation to the 'stock' attribute as the display duration. That is, when the predetermined prediction time in relation to the 'stock' attribute is '1 second' and when the attribute of the extracted word from the image is detected as 'stock,' the predictor 201 may predict the display duration of the word as '1 second,' which is the predetermined prediction time in relation to the 'stock' attribute.

The processor 202 may adjust a luminance value of a pixel in an area corresponding to the object in the image based on the predicted display duration, and display the image in which the adjusted luminance value of the pixel is reflected. More specifically, the processor 202 may include a detector 203, a determiner 204, and a controller 205.

The detector 203 may detect a luminance value of the pixel in the area corresponding to the object. Also, the detector 203 may further detect a color of the pixel in the area corresponding to the object.

In response that the type of object is a logo, the detector 203 may divide the logo into a plurality of segments based on a luminance value of a pixel in the logo, and detect the luminance value corresponding to each of the divided plurality of segments.

As another example of dividing the object in the image into the plurality of segments, in response that the type of object is a logo, the detector 203 may divide the logo into a plurality of segments based on a color of the pixel in the logo, and detect the luminance value corresponding to each of the divided plurality of segments.

In detecting the luminance value corresponding to the segment, when the luminance value of each pixel in the segment is the same, the detector 203 may detect the luminance value of the pixel as the luminance value corresponding to the segment. By contrast, when the luminance value of each pixel in the segment is not the same, the detector 203 may calculate an average value of each pixel in the segment, and detect the calculated average value as the luminance value corresponding to the segment.

The determiner 204 may determine a luminance adjustment value based on the predicted display duration. In this case, the determiner 204 may determine the luminance adjustment value in proportion to the predicted display duration.

Also, when the detector 203 has divided the logo into the plurality of segments based on the luminance value of the pixel in the logo, the determiner 204 may determine a degree of burn-in effect for each luminance value for each of the plurality of segments in the logo, and determine a luminance adjustment value for each of the plurality of segments based on the determined degree of burn-in effect for each luminance value and the predicted display duration of the logo. In this case, the determiner 204 may determine the luminance adjustment value in proportion to the predicted display duration of the logo, and determine the luminance adjustment value for each of the plurality of segments by subtracting a first set value corresponding to the determined degree of burn-in effect for each luminance value for each of the plurality of segments, from the determined luminance adjustment value.

When the detector 203 has divided the logo into the plurality of segments based on the color of the pixel in the logo, the determiner 204 may determine the degree of burn-in effect for each color for each of the plurality of segments in the logo, and determine the luminance adjustment value for each of the plurality of segments based on the determined degree of burn-in effect for each color and the predicted display duration of the logo. In this case, the determiner 204 may determine the luminance adjustment value in proportion to the predicted display duration of the logo, and determine the luminance adjustment value for each of the plurality of segments by subtracting a second set value corresponding to the determined degree of burn-in effect for each color for each of the plurality of segments, from the determined luminance adjustment value.

The controller 205 may adjust the detected luminance value of the pixel based on the luminance adjustment value, and control the pixel according to the adjusted luminance value of the pixel. In this case, the controller 205 may adjust the detected luminance value of the pixel to be reduced by the luminance adjustment value.

In controlling the pixel, in response that the adjusted luminance value of the pixel is smaller than a predetermined minimum luminance value, the controller 205 may control the pixel to the minimum luminance value. That is, when the adjusted luminance value of the pixel is too low, the controller 205 may control the pixel to the minimum luminance value such that a user is not inconvenienced in viewing the image.

Also, when the detector 203 has further detected the color of the pixel in the area corresponding to the object, the controller 205 may limit occurrence of a burn-in phenomenon for the color by further adjusting the adjusted luminance value of the pixel based on the detected color of the pixel. In this case, the controller 205 may further adjust the adjusted luminance adjustment value of the pixel based on the display duration to be reduced by a predetermined color adjustment value corresponding to the color of the pixel. Here, the color adjustment value may be predetermined differently based on the degree of burn-in effect for each color.

Also, when the determiner 204 has determined the luminance adjustment value for each of the plurality of segments, the controller 205 may adjust the luminance value corresponding to each of the divided plurality of segments, based on the determined luminance adjustment value for each of the plurality of segments, and control the pixels in the plurality of segments according to the adjusted luminance value. In this case, the controller 205 may reduce the luminance value corresponding to each of the divided plurality of segments, by the determined luminance adjustment value for each of the plurality of segments, and control the pixels in the plurality of segments according to the reduced luminance value.

The controller 205 may control the plurality of segments that are divided according to the luminance value or the color of the pixel in the logo extracted as the object in the image, respectively, thereby reducing influences of the luminance value or the color on the burn-in phenomenon and allowing the logo in the image to be displayed clearly.

Meanwhile, in determining the degree of burn-in effect for each luminance value (or the degree of burn-in effect for each color), the determiner 204 may use a learning model which has been trained in advance to detect the degree of burn-in effect for each luminance value (or the degree of burn-in effect for each color) or a table in which the degree of burn-in effect for each luminance value (or the degree of burn-in effect for each color) is recorded.

Figure 3:
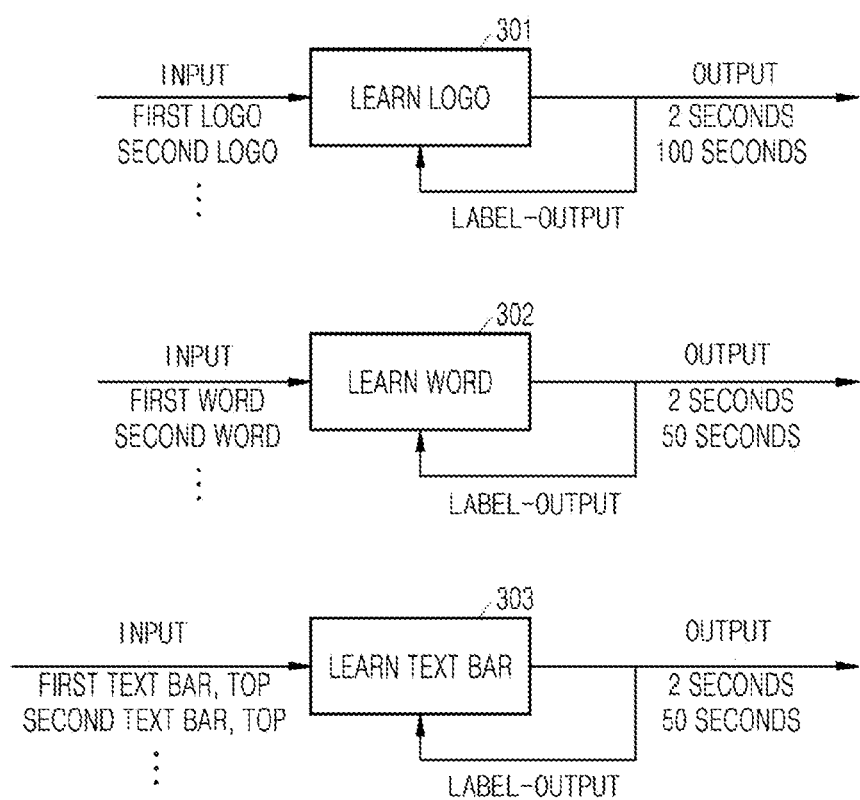
FIG. 3 is a diagram illustrating an example of training to predict a display duration of an object in an image in the display device according to one embodiment of the present disclosure.

FIG. 3 is a diagram illustrating an example of training to predict the display duration of the object in the image in the display device according to one embodiment of the present disclosure.

Referring to FIG. 3, the display device may include a software module or a hardware module (hereinafter referred to as an artificial intelligence module) configured to implement artificial intelligence (AI).

The display device may machine learn the display duration of an inputted object, using at least one artificial neural network (ANN), such as a deep neural network model, by means of an artificial intelligence module. That is, the deep neural network model may be trained by receiving a data set in which information on an extracted object from the image and the duration of the extracted object is labeled.

More specifically, the data set may consist of a logo that is extracted from the image, as an input, and a display duration of that logo, labeled as an output, and the deep neural network may learn using the data set. For example, the deep neural network model of the display device may perform a process 301, in which the deep neural network model learns by itself to output the labeled 2 seconds as the display duration when a first logo is inputted, and learns by itself to output the labeled 100 seconds as the display duration when a second logo is inputted.

Also, the data set may consist of a word that is extracted from the image, as an input, and a display duration of that word, labeled as an output, and the deep neural network may learn using the data set. For example, the deep neural network model of the display device may perform a process 302, in which the deep neural network model learns by itself to output the labeled 2 seconds as the display duration when a first word is inputted, and learns by itself to output the labeled 50 seconds as the display duration when a second word is inputted.

Also, the data set may consist of a text bar that is extracted from the image and a position of the text bar, as an input, and a display duration of that text bar, labeled as an output, and the deep neural network may learn using the data set. For example, the deep neural network model of the display device may perform a process 303, in which the deep neural network model learns by itself to output the labeled 2 seconds as the display duration when a first text bar and a top position are inputted, and learns by itself to output the labeled 50 seconds as the display duration when a second text bar and the top position are inputted.

That is, the deep neural network model of the display device may be trained to predict display durations of the logo, the word, and the text bar in the image that are subsequently inputted to the display device, by performing the processes for learning the display durations of the logo, the word, and the text bar in the image.

Figure 4:
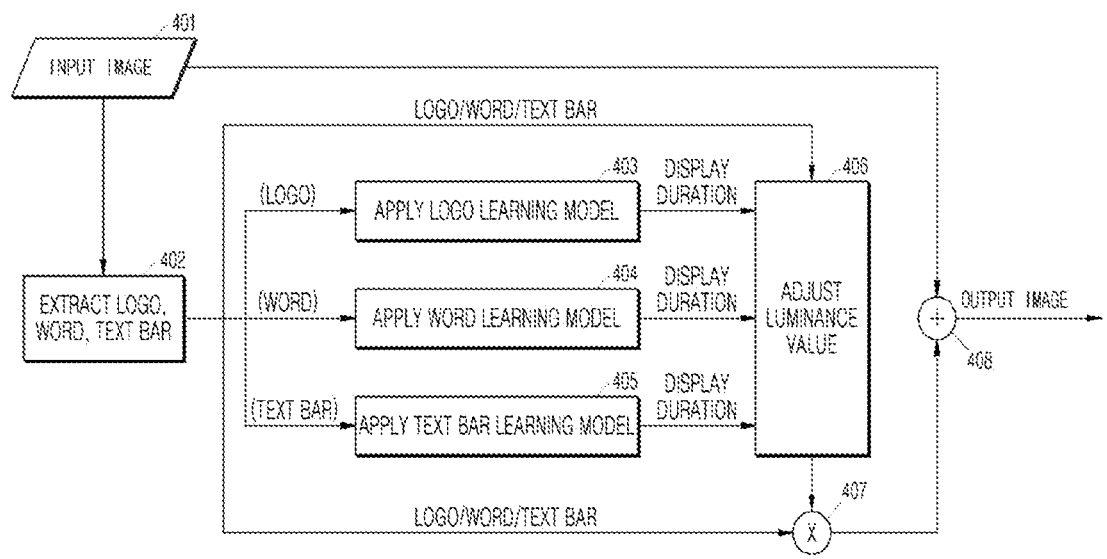
FIG. 4 is a diagram illustrating a process of processing the image by using the display duration of the object in the image in the display device according to one embodiment of the present disclosure.

FIG. 4 is a diagram illustrating a process of processing the image by using the display duration of the object in the image in the display device according to one embodiment of the present disclosure.

Referring to FIG. 4, when an image is inputted, at 401, the display device may extract a logo, a word, and a text bar as a predetermined type of object from the inputted image, at 402. In this case, the display device may apply the inputted image to a learning model which has been trained in advance to recognize the logo, the word, and the text bar in the image. As a result, the display device may extract the logo, the word, and the text bar from the inputted image.

The display device may apply the extracted object to a learning model which has been trained in advance to predict the display durations of the logo, the word, and the text bar appearing in the image. As a result, the display device may predict the display duration of the extracted object. In this case, the display device may apply the extracted logo to a logo learning model and predict the display duration of the logo, at 403. The display device may apply the extracted word to a word learning model to predict the display duration of the word, at 404. Also, the display device may apply the extracted text bar to a text bar learning model to predict the display duration of the text bar, at 405. Here, the logo learning model, the word learning model, and the text bar learning model may be respectively learned and separately generated in advance, or may be generated as one learning model.

The display device may determine a luminance adjustment value based on the display duration of each of the logo, the word, and the text bar, and adjust the luminance value of the pixel for each of the logo, the word, and the text bar to be reduced by the determined luminance adjustment value, at 406.

The display device may change a luminance value of a pixel in an area corresponding to the logo, the word, and the text bar to the adjusted luminance value of the pixel, at 407. The display device may reflect, in the inputted image, the logo, the word, and the text bar of which the luminance value has been changed to the adjusted luminance value of the pixel, and output the image, at 408.

Figure 5:
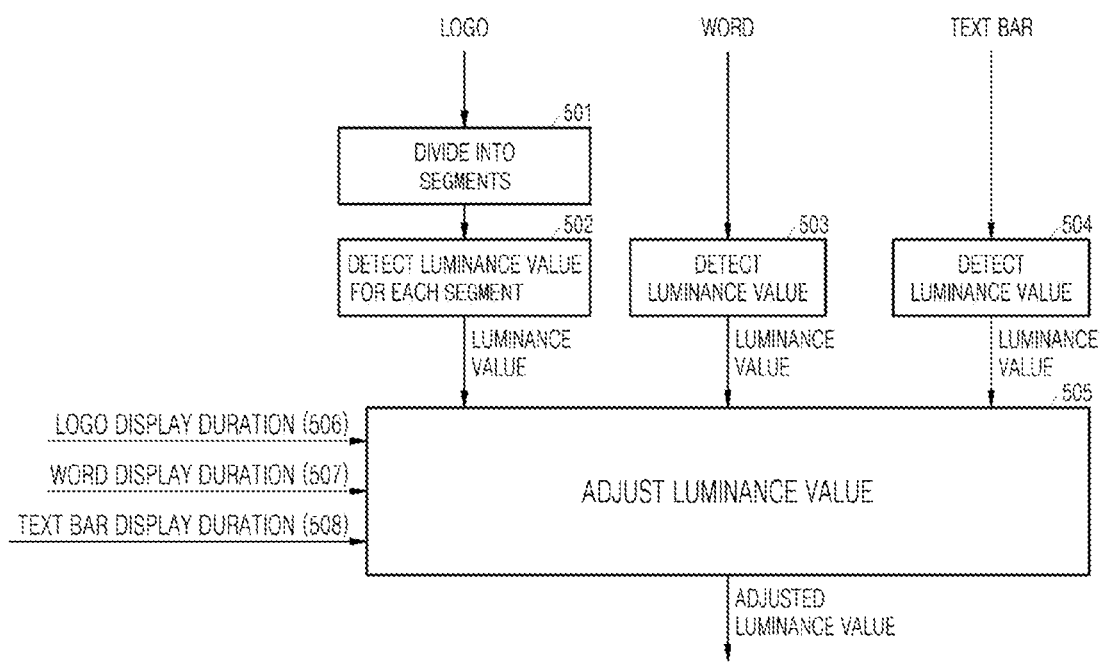
FIG. 5 is a diagram illustrating a process of adjusting a luminance value of the pixel in FIG. 4.

FIG. 5 is a diagram illustrating a process of adjusting the luminance value of the pixel in FIG. 4.

Referring to FIG. 5, when the object is extracted from the inputted image, the display device may detect a luminance value of a pixel in an area corresponding to the object.

When a type of object extracted from the image is a logo, the display device may divide the logo into a plurality of segments based on a luminance value (or a color) of a pixel in the logo, at 501. The display device may then detect the luminance value corresponding to each of the divided plurality of segments, at 502.

When the type of object extracted from the image is a word, the display device may detect a luminance value of a pixel in an area corresponding to the word, at 503.

Also, when the type of the extracted object from the image is a text bar, the display device may detect a luminance value of a pixel in an area corresponding to the text bar, at 504.

The display device may determine a luminance adjustment value based on the predicted display duration of the object, and adjust the luminance value of the pixel in the area corresponding to the object to be reduced by the determined luminance adjustment value, at 505. Here, the display device may determine the luminance adjustment value in proportion to the display duration of the object.

For example, the display device may determine the luminance adjustment value based on a logo display duration 506, and adjust a luminance value of a pixel in an area corresponding to the logo to be reduced by the determined luminance adjustment value.

Meanwhile, when the logo is divided into a plurality of segments, the display device may determine a degree of burn-in effect for each luminance value (or a degree of burn-in effect for each color) for each of the plurality of segments in the logo, and determine the luminance adjustment value for each of the plurality of segments based on the determined degree of burn-in effect for each luminance value (or the degree of burn-in effect for each color) and the logo display duration 506. Thereafter, the display device may adjust the luminance value corresponding to each of the divided plurality of segments to be reduced by the determined luminance adjustment value for each of the plurality of segments.

The display device may determine the luminance adjustment value based on a word display duration 507, and adjust a luminance value of a pixel in an area corresponding to the word to be reduced by the determined luminance adjustment value.

Also, the display device may determine the luminance adjustment value based on a text bar display duration 508, and adjust a luminance value of a pixel in an area corresponding to the text bar to be reduced by the determined luminance adjustment value.

Figure 6:
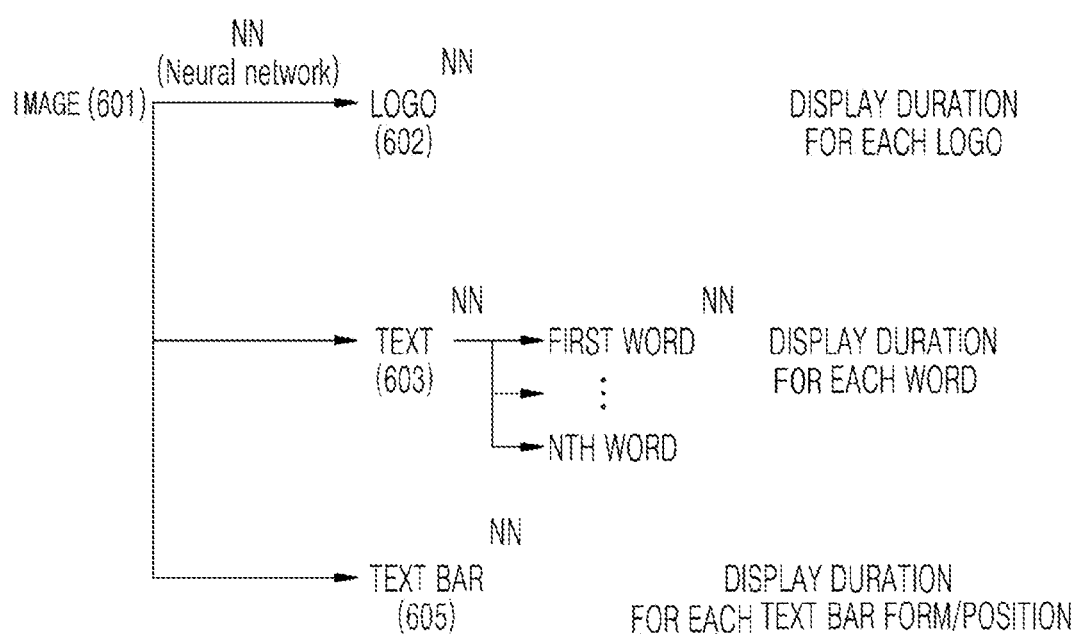
FIG. 6 is a diagram illustrating a process of predicting the display duration of the object in the image in the display device according to one embodiment of the present disclosure.

Hereinafter, an example of displaying the image in the display device according to one embodiment of the present disclosure will be described with reference to FIGS. 6 and 7. FIG. 6 is a diagram illustrating a process of predicting the display duration of the object in the image in the display device according to one embodiment of the present disclosure, and FIG. 7 is a diagram illustrating an example of applying the process of FIG. 6 to the image.

Figure 7:
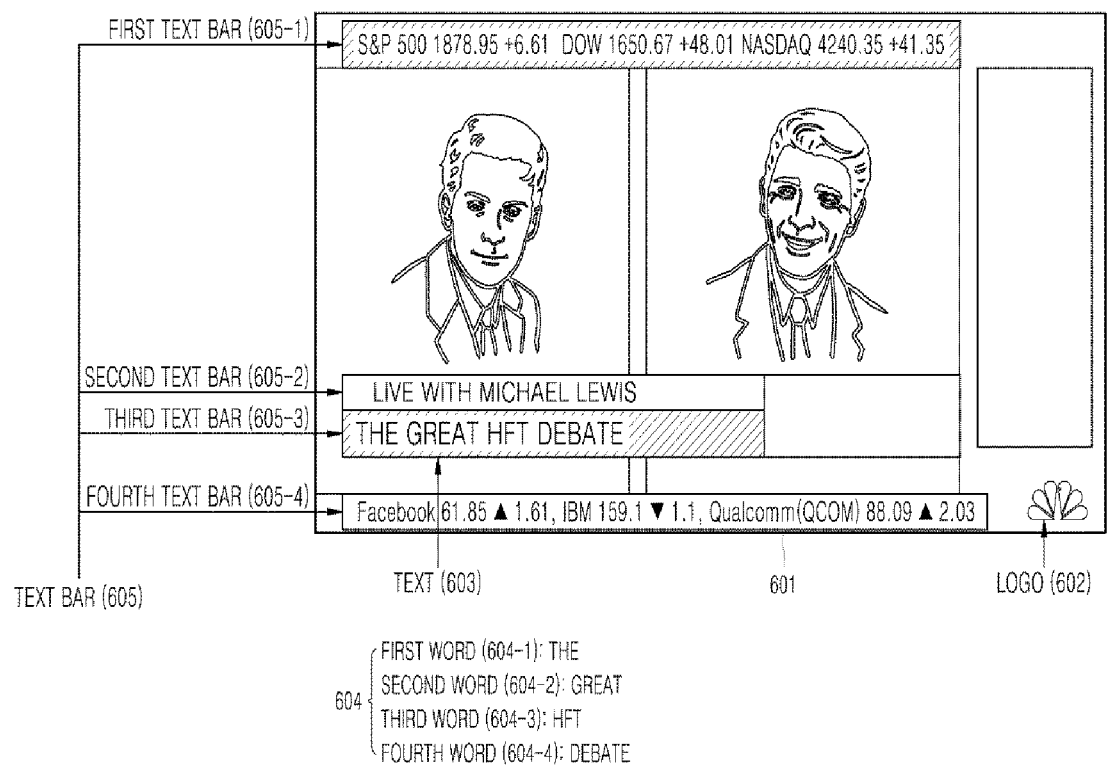
FIG. 7 is a diagram illustrating an example of applying the process of FIG. 6 to the image.

Referring to FIGS. 6 and 7, the display device may extract a logo 602, a word 604, and a text bar 605 as a predetermined type of object from an inputted image 601. In this case, the display device may apply to the inputted image 601, a learning model (a first deep neural network) which has been trained in advance to recognize the logo, the word, and the text bar in the image. As a result, the display device may extract the logo, the word, and the text bar.

In this case, when the learning model which has been trained to recognize text is used, the display device may apply the trained learning model to extract a text 603 from the image. The display device may then apply, to the extracted text 603, the learning model which has been trained to recognize the word 604, to extract the word 604 from the text 603. For example, the display device may extract the text 603 of 'THE GREAT HFT DEBATE' from the image. The display device may then extract a first word 604-1 of 'THE,' a second word 604 of 'GREAT,' a third word 604-3 of 'HFT,' and a fourth word 604-4 of 'DEBATE' from the text 603.

The display device may predict the display durations of the extracted logo 602, word 604, and text bar 605. In this case, the display device may apply, to the logo 602, word 604, and text bar 605, a learning model (a second deep neural network) which has been trained in advance to predict the display durations of the logo, the word, and the text bar appearing in the image. As a result, the display device may predict display durations of the logo 602, the word 604, and the text bar 605.

In predicting the display duration of the text bar 605, the display device may apply a learning model which has been trained to predict the duration of the text bar based on at least one of a form or a position of the text bar. As a result, the display device may predict different display durations according to the form (or size) and the position of the text bar 605. For example, the display device may predict the display duration of each text bar differently, as the sizes and positions of the first text bar 605-1, the second text bar 605-2, the third text bar 605-3, and the fourth text bar 605-4 differ.

The display device may adjust a luminance value of a pixel in an area corresponding to the logo 602, the word, 604 and the text bar 605 based on the predicted display duration of each of the logo 605, the word 604, and the text bar 605, and display the image in which the adjusted luminance value of the pixel is reflected, thereby reducing a burn-in phenomenon.

Meanwhile, the display device may divide the logo 602 extracted from the image into a plurality of segments according to a predetermined reference (for example, a color), and control the luminance value of the pixel for each divided segment, which will be described below with reference to FIG. 8.

Figure 8:
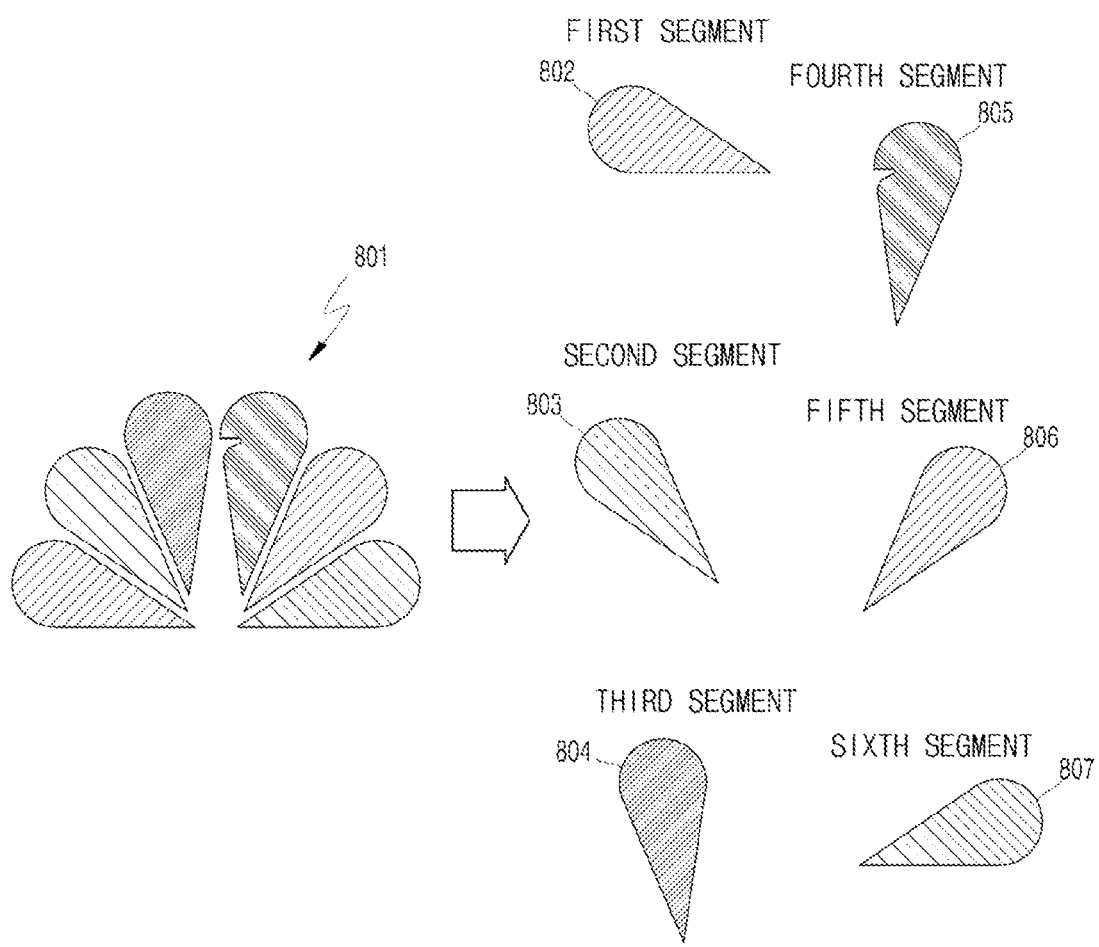
FIG. 8 is a diagram illustrating an example of adjusting a luminance value of a logo object in the image in the display device according to one embodiment of the present disclosure.

FIG. 8 is a diagram illustrating an example of adjusting a luminance value of a logo object in the image in the display device according to one embodiment of the present disclosure.

Referring to FIG. 8, when a type of object extracted from the image is a logo, the display device may divide the logo into a plurality of segments based on a color of a pixel in the logo, and detect a luminance value corresponding to each of the divided plurality of segments.

For example, when an 'NBC' logo 801 is extracted from the image, the display device may divide the 'NBC' logo 801 into first through sixth segments 802 to 807 based on a color of a pixel in the 'NBC' logo 801, and detect luminance values corresponding to the first to sixth segments 802 to 807. In detecting the luminance value corresponding to the first segment 802, when the luminance value of each pixel in the first segment 802 is the same, the display device may detect the luminance value of the pixel as the luminance value corresponding to the first segment 802. By contrast, when the luminance value of each pixel in the first segment 802 is not the same, the display device may calculate an average value of each pixel in the first segment 802, and detect the calculated average value as the luminance value corresponding to the first segment 802.

The display device may determine a degree of burn-in effect for each color for each of the plurality of segments in the logo, and determine a luminance adjustment value for each of the plurality of segments based on the determined degree of burn-in effect for each color and the display duration of the logo. When the first segment 802 is 'yellow,' the display device may determine a degree of burn-in effect for 'yellow' (i.e., a degree to which the burn-in effect occurs when yellow is displayed) by searching a predetermined burn-in effect table for each color. The display device may then determine the luminance adjustment value for the first segment 802 based on the degree of burn-in effect for 'yellow' and the display duration of the 'NBC' logo 801. In this case, the display device may subtract a setting value corresponding to the degree of the burn-in effect for 'yellow,' from the determined luminance adjustment value in proportion to the display duration of the 'NBC' logo 801, and determine the luminance adjustment value for the first segment 802.

Also, when a fifth segment 806 is 'blue,' the display device may determine a degree of burn-in effect for 'blue' (i.e., a degree to which burn-in effect occurs when blue is displayed) by searching the predetermined burn-in effect table for each color. The display device may then determine the luminance adjustment value for the first segment 806 based on the degree of burn-in effect for 'blue' and the display duration of the 'NBC' logo 801. In this case, the display device may subtract a setting value corresponding to the degree of the burn-in effect for 'blue' from the determined luminance adjustment value in proportion to the display duration of the 'NBC' logo 801, and determine the luminance adjustment value for the fifth segment 806.

The display device may reduce the luminance value (the existing luminance value in the inputted image) corresponding to each of the divided plurality of segments, by the determined luminance adjustment value for each of the plurality of segments, and control pixels in the plurality of segments according to the reduced luminance value. For example, when the luminance value corresponding to the first segment 802 in a logo in the inputted image is '0.73' and the determined luminance adjustment value for the first segment 802 is '0.23,' the display device may control the luminance value of the pixel in the first segment 802 to '0.50,' which is the luminance value obtained by subtracting the luminance adjustment value from the luminance value. When the luminance value corresponding to the fifth segment 806 in the logo in the inputted image is '0.40' and the determined luminance adjustment value for the fifth segment 806 is '0.10,' the display device may control the luminance value of the pixel in the fifth segment 806 to '0.30,' which is the luminance value obtained by subtracting the luminance adjustment value from the luminance value.

Also, for the second, third, fourth, and sixth segments 803, 804, 805, 807 in the logo in the inputted image, the display device may control the luminance value of the pixel in each segment based on the degree of burn-in effect for that color and the display duration of the 'NBC' logo 801.

Figure 9:
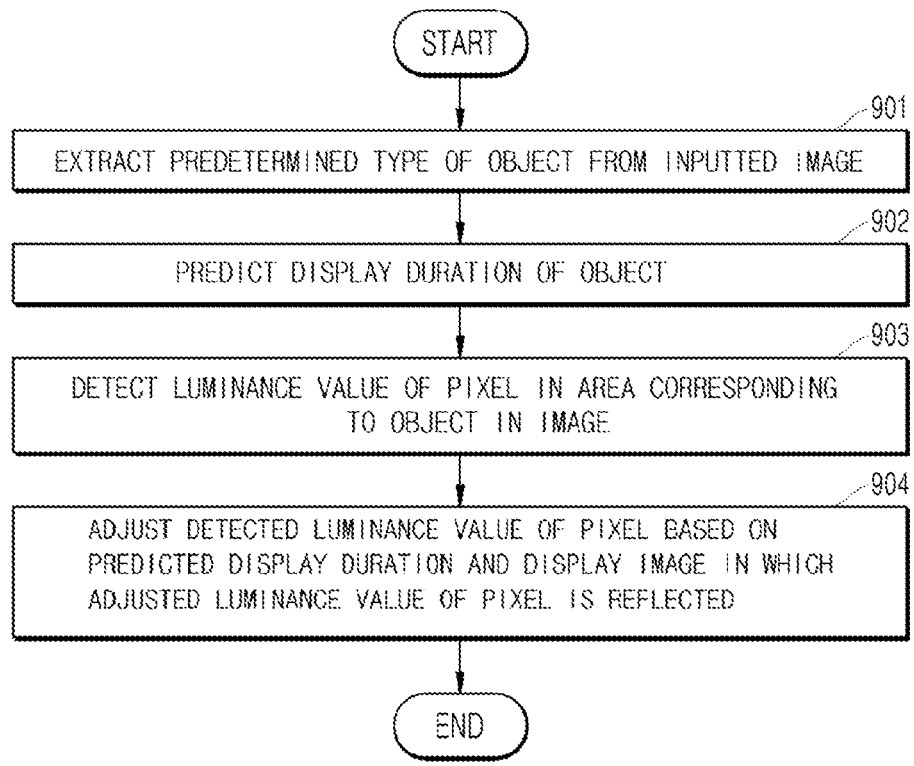
FIG. 9 is a flowchart illustrating a display method according to one embodiment of the present disclosure.

FIG. 9 is a flowchart illustrating a display method according to one embodiment of the present disclosure.

Referring to FIG. 9, in step 901, the display device may extract a predetermined type of object from an inputted image. Here, the display device may extract at least one of a logo, a word, or a text bar as the predetermined type of object. In this case, the display device may extract the text bar from the image and then extract the word from the extracted text bar.

In this case, the display device may perform a first deep neural network algorithm on the image to extract the predetermined type of object from the image. Here, the first deep neural network is a learning model which has been trained in advance to recognize durations of the logo, the word, and the text bar in the image.

In step 902, the display device may predict a display duration of the extracted object. In this case, the display device may perform a second deep neural network algorithm on the extracted object to predict the display duration of the object. Here, the second deep neural network is a learning model which has been trained in advance to predict durations of the logo, the word, and the text bar appearing in the image.

In predicting the display duration of the object, the display device may predict the display duration based on at least one of a position (for example, a pixel position spaced apart from a top, bottom, or reference pixel by n pixels (where n is a natural number)) or a size (or a form) of the object in the image.

Meanwhile, in response that the type of object is a word, the display device may detect an attribute of the word and predict the display duration based on the attribute of the word (for example, stocks, exchange rates, weather or the like), thereby accurately obtaining the display duration according to the attribute of the word. For example, the attribute of the word may be a type of information indicated by the word.

In step 903, the display device may detect a luminance value of a pixel in an area corresponding to the object in the image.

In this case, in response that the type of object is a logo, the display device may divide the logo into a plurality of segments based on the luminance value of the pixel in the logo and detect the luminance value corresponding to each of the divided plurality of segments.

As another example of dividing the object in the image into the plurality of segments, in response that the type of object is a logo, the display device may divide the logo into a plurality of segments based on a color of the pixel in the logo, and detect the luminance value corresponding to each of the divided plurality of segments.

In step 904, the display device may adjust the detected luminance value of the pixel based on the predicted display duration, and display the image in which the adjusted luminance value of the pixel is reflected.

More specifically, the display device may determine a luminance adjustment value based on the predicted display duration and adjust the detected luminance value of the pixel in the area corresponding to the object based on the determined luminance adjustment value. In this case, for example, the display device may adjust the detected luminance value of the pixel in the area corresponding to the object to be reduced by the determined luminance adjustment value. Thereafter, the display device may control the pixel according to the adjusted luminance value of the pixel.

Also, the display device may further detect a color of the pixel in the area corresponding to the object and further adjust the adjusted luminance value of the pixel based on the detected color of the pixel, thereby minimizing influences of the color on a burn-in phenomenon. In this case, the display device may further adjust the adjusted luminance adjustment value of the pixel based on the display duration to be reduced by a predetermined color adjustment value corresponding to the color of the pixel.

In controlling the pixel, in response that the adjusted luminance value of the pixel is smaller than a predetermined minimum luminance value, the display device may control the pixel to the minimum luminance value. That is, when the adjusted luminance value of the pixel is too low, the display device may control the pixel to the minimum luminance value such that a user is not inconvenienced in viewing the image.

Meanwhile, when the logo is divided into a plurality of segments based on the luminance value of the pixel in the logo, the display device may determine a degree of burn-in effect for each luminance value for each of the plurality of segments in the logo. The display device may determine a luminance adjustment value for each of the plurality of segments based on the determined degree of burn-in effect for each luminance value and the predicted display duration of the logo.

In this case, the display device may determine the luminance adjustment value in proportion to the predicted display duration of the logo, and determine the luminance adjustment value for each of the plurality of segments by subtracting a first set value corresponding to the determined degree of burn-in effect for each luminance value for each of the plurality of segments, from the determined luminance adjustment value.

Thereafter, the display device may adjust the luminance value corresponding to each of the divided plurality of segments, based on the determined luminance adjustment value for each of the plurality of segments (for example, reduce the luminance value corresponding to each of the divided plurality of segments, by the determined luminance adjustment value for each of the plurality of segments), and control pixels in the plurality of segments according to the adjusted luminance value.

Also, when the logo is divided into the plurality of segments based on the color of the pixel in the logo, the display device may determine the degree of burn-in effect for each color for each of the plurality of segments in the logo. The display device may determine the luminance adjustment value for each of the plurality of segments based on the determined degree of burn-in effect for each color and the predicted display duration of the logo.

In this case, the display device may determine the luminance adjustment value in proportion to the predicted display duration of the logo, and determine the luminance adjustment value for each of the plurality of segments by subtracting a second set value corresponding to the determined degree of burn-in effect for each color for each of the plurality of segments, from the determined luminance adjustment value.

Thereafter, the display device may adjust the luminance value corresponding to each of the divided plurality of segments based on the determined luminance adjustment value for each of the plurality of segments (for example, reduce the luminance value corresponding to each of the divided plurality of segments, by the determined luminance adjustment value for each of the plurality of segments), and control pixels in the plurality of segments according to the adjusted luminance value.

Embodiments according to the present disclosure described above may be implemented in the form of computer programs that may be executed through various components on a computer, and such computer programs may be recorded in a computer-readable medium. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," "such as") used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A display method for reducing a burn-in phenomenon, comprising:

extracting a predetermined type of object from an inputted image by performing a first deep neural network (DNN) algorithm on the image;

predicting a display duration of the extracted object by performing a second DNN algorithm on the extracted object; and adjusting a luminance value of a pixel in an area corresponding to the object in the image based on the predicted display duration, and displaying the image in which the adjusted luminance value of the pixel is reflected, wherein the first DNN is a learning model which has been trained in advance to recognize a logo, a word, and a text bar in the image, and wherein the second DNN is a learning model which has been trained in advance to predict durations of the logo, the word, and the text bar appearing in the image.

2. The method of claim 1, wherein the predicting the display duration comprises predicting the display duration based on at least one of a position or a size of the object in the image.

3. The method of claim 1, wherein the extracting the object comprises extracting at least one of the logo, the word, or the text bar as the predetermined type of object.

4. The method of claim 1, wherein the displaying the image comprises:

detecting the luminance value of the pixel in the area corresponding to the object;

determining a luminance adjustment value based on the predicted display duration; and adjusting the detected luminance value of the pixel based on the luminance adjustment value, and controlling the pixel according to the adjusted luminance value of the pixel.

5. The method of claim 4, wherein the displaying the image further comprises detecting a color of the pixel in the area corresponding to the object, and the controlling the pixel comprises further adjusting the adjusted luminance value of the pixel based on the detected color of the pixel.

6. The method of claim 4, wherein the controlling the pixel comprises, in response that the adjusted luminance value of the pixel is smaller than a predetermined minimum luminance value, controlling the pixel to the minimum luminance value.

7. The method of claim 1, wherein the predicting the display duration comprises, in response that the type of object is a word, detecting an attribute of the word; and predicting the display duration based on the attribute of the word.

8. The method of claim 1, wherein the displaying the image comprises, in response that the type of object is a logo, dividing the logo into a plurality of segments based on a luminance value of a pixel in the logo, and detecting a luminance value corresponding to each of the divided plurality of segments;

determining a degree of burn-in effect for each luminance value for each of the plurality of segments in the logo;

determining a luminance adjustment value for each of the plurality of segments based on the determined degree of burn-in effect for each luminance value and the predicted display duration of the logo; and adjusting the luminance value corresponding to each of the divided plurality of segments, based on the determined luminance adjustment value for each of the plurality of segments, and controlling pixels in the plurality of segments according to the adjusted luminance value.

9. The method of claim 1, wherein the displaying the image comprises, in response that the type of object is a logo, dividing the logo into a plurality of segments based on a color of a pixel in the logo, and detecting a luminance value corresponding to each of the divided plurality of segments;

determining a degree of burn-in effect for each luminance value for each of the plurality of segments in the logo;

determining a luminance adjustment value for each of the plurality of segments based on the determined degree of burn-in effect for each color and the predicted display duration; and adjusting the luminance value corresponding to each of the divided plurality of segments, based on the determined luminance adjustment value for each of the plurality of segments, and controlling pixels in the plurality of segments according to the adjusted luminance value.

10. A display device configured to reduce a burn-in phenomenon, comprising:

a predictor configured to extract a predetermined type of object from an inputted image by performing a first deep neural network (DNN) algorithm on the image, and predict a display duration of the extracted object by performing a second DNN algorithm on the extracted object; and a processor configured to adjust a luminance value of a pixel in an area corresponding to the object in the image based on the predicted display duration, and display the image in which the adjusted luminance value of the pixel is reflected, wherein the first DNN is a learning model which has been trained in advance to recognize a logo, a word, and a text bar in the image, and wherein the second DNN is a learning model which has been trained in advance to predict durations of the logo, the word, and the text bar appearing in the image.

11. The display device of claim 10, wherein the predictor is configured to predict the display duration based on at least one of a position or a size of the object in the image.

12. The display device of claim 10, wherein the predictor is configured to extract at least one of the logo, the word, or the text bar as the predetermined type of object.

13. The display device of claim 10, wherein the processor comprises, a detector configured to detect the luminance value of the pixel in the area corresponding to the object;

a determiner configured to determine a luminance adjustment value based on the predicted display duration; and a controller configured to adjust the detected luminance value of the pixel based on the luminance adjustment value, and control the pixel according to the adjusted luminance value of the pixel.

14. The display device of claim 13, wherein the controller is configured to, in response that the detector further detects a color of the pixel in the area corresponding to the object, further adjust the adjusted luminance value of the pixel based on the detected color of the pixel.

15. The display device of claim 13, wherein the controller is configured to, in response that the adjusted luminance value of the pixel is smaller than a predetermined minimum luminance value, control the pixel to the minimum luminance value.

16. The display device of claim 10, wherein the predictor is configured to, in response that the type of object is a word, detect an attribute of the word and predict the display duration based on the attribute of the word.

17. The display device of claim 10, wherein the processor comprises,
- a detector configured to, in response that the type of object is a logo, divide the logo into a plurality of segments based on a luminance value of a pixel in the logo, and detect a luminance value corresponding to each of the divided plurality of segments;
- a determiner configured to determine a degree of burn-in effect for each luminance value for each of the plurality of segments in the logo and determine a luminance adjustment value for each of the plurality of segments based on the determined degree of burn-in effect for each luminance value and the predicted display duration; and
- a controller configured to adjust the luminance value corresponding to each of the divided plurality of segments, based on the determined luminance adjustment value for each of the plurality of segments, and control pixels in the plurality of segments according to the adjusted luminance value.

18. The display device of claim 10, wherein the processor comprises,
- a detector configured to, in response that the type of object is a logo, divide the logo into a plurality of segments based on a color of a pixel in the logo, and detect a luminance value corresponding to each of the divided plurality of segments;
- a determiner configured to determine a degree of burn-in effect for each color for each of the plurality of segments in the logo and determine a luminance adjustment value for each of the plurality of segments based on the determined degree of burn-in effect for each color and the predicted display duration; and
- a controller configured to adjust the luminance value corresponding to each of the divided plurality of segments, based on the determined luminance adjustment value for each of the plurality of segments, and control pixels in the plurality of segments according to the adjusted luminance value.

* * * * *